United States Patent
Merrick et al.

(10) Patent No.: US 7,470,898 B2
(45) Date of Patent: Dec. 30, 2008

(54) MONITORING DRINKING WATER QUALITY USING DIFFERENTIAL MOBILITY SPECTROMETRY

(75) Inventors: William F. Merrick, San Francisco, CA (US); Julie E. Zeskind, Brookline, MA (US); Melissa D. Krebs, Shaker Heights, OH (US); Christina E. Davis, Berkeley, CA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 27 days.

(21) Appl. No.: 11/417,897

(22) Filed: May 4, 2006

(65) Prior Publication Data

US 2007/0083127 A1 Apr. 12, 2007

Related U.S. Application Data

(63) Continuation-in-part of application No. 10/817,455, filed on Apr. 1, 2004, now abandoned.

(60) Provisional application No. 60/695,291, filed on Jun. 30, 2005, provisional application No. 60/678,080, filed on May 5, 2005, provisional application No. 60/459,424, filed on Apr. 1, 2003.

(51) Int. Cl.
*H01J 49/40* (2006.01)
(52) U.S. Cl. .................. 250/286; 250/287; 250/282
(58) Field of Classification Search ................. 250/286, 250/287, 281, 282
See application file for complete search history.

(56) References Cited

U.S. PATENT DOCUMENTS

| | | | |
|---|---|---|---|
| 4,579,826 | A | 4/1986 | Bolton et al. |
| 5,401,963 | A | 3/1995 | Sittler |
| 5,420,424 | A | 5/1995 | Carnahan et al. |
| 5,425,374 | A | 6/1995 | Ueda et al. |
| 5,455,417 | A | 10/1995 | Sacristan |
| 5,492,867 | A | 2/1996 | Kotvas et al. |
| 5,763,876 | A | 6/1998 | Pertinarides et al. |
| 5,789,745 | A | 8/1998 | Martin et al. |
| 6,010,459 | A | 1/2000 | Silkoff et al. |
| 6,124,592 | A | 9/2000 | Spangler |
| 6,495,823 | B1 | 12/2002 | Miller et al. |
| 6,512,224 | B1 | 1/2003 | Miller et al. |
| 6,610,977 | B2 | 8/2003 | Megerle |
| 6,627,881 | B1 | 9/2003 | Bertrand et al. |
| 6,639,212 | B1 | 10/2003 | Guevremont et al. |

(Continued)

FOREIGN PATENT DOCUMENTS

DE 10114141 A1 9/2002

(Continued)

OTHER PUBLICATIONS

Hall et al. "Kansas City's Bottled Water Experiences" Opflow, 2000, 4-5, 8.

(Continued)

*Primary Examiner*—Kiet T Nguyen
(74) *Attorney, Agent, or Firm*—Goodwin Procter LLP

(57) ABSTRACT

Continuous monitoring of fluid composition, e.g. drinking water supply, with improved detection sensitivity and selectivity to varying degrees of contamination at and below the predetermined maximum contaminant levels using pyrolysis-differential mobility spectrometry.

9 Claims, 12 Drawing Sheets

U.S. PATENT DOCUMENTS

| | | | |
|---|---|---|---|
| 6,653,627 | B2 | 11/2003 | Guevremont et al. |
| 6,675,104 | B2 | 1/2004 | Paulse et al. |
| 6,690,004 | B2 | 2/2004 | Miller et al. |
| 7,227,134 | B2 * | 6/2007 | Miller et al. ............... 250/288 |
| 7,241,989 | B2 * | 7/2007 | Miller et al. ............... 250/282 |
| 2002/0060290 | A1 | 5/2002 | Pham |
| 2002/0138208 | A1 | 9/2002 | Paulse et al. |
| 2002/0193950 | A1 | 12/2002 | Gavin et al. |
| 2002/0195555 | A1 | 12/2002 | Weinberger et al. |
| 2003/0047681 | A1 | 3/2003 | Guevremont et al. |
| 2003/0085348 | A1 | 5/2003 | Megerle |
| 2003/0132380 | A1 | 7/2003 | Miller et al. |
| 2003/0146377 | A1 | 8/2003 | Miller et al. |
| 2003/0208133 | A1 | 11/2003 | Mault |
| 2003/0218130 | A1 | 11/2003 | Boschetti et al. |
| 2005/0253061 | A1 * | 11/2005 | Cameron et al. ............ 250/287 |

FOREIGN PATENT DOCUMENTS

| | | |
|---|---|---|
| EP | 0347101 A2 | 12/1989 |

OTHER PUBLICATIONS

Gupta, et al. "The Milwaukee Cryptosporidium outbreak: assessment of incubation time and daily attack rate" J Water Health, 2004, 2: 59-69.

Widmer, et al. "Water-borne Cryptosporidium: A Perspective from the USA" Parasitol Today, 1996, 12(7): 286-290.

Holme, R. "Drinking water contamination in Walkerton, Ontario: positive resolutions from a tragic event" Water Sci Technol, 2003, 47(3): 1-6.

Hrudey, et al. "A fatal waterborne disease epidemic in Walkerton, Ontario: comparison with other waterborne outbreaks in the developed world" Water Sci Technol, 2003, 47(3): 7-14.

Howe, et al. "Cryptosporidum Oocysts in a Water Supply Associated with a Cryptosporidiosis Outbreak" Emerg Infect Dis, 2002, 8(6) : 619-624.

Harrison, et al. "Managing a large outbreak of cryptosporidiosis: how to investigate and when to decide to lift a 'boil water' notice" Commun Dis Public Health, 2002, 5(3): 230-239.

Dalle, et al. "Molecular Characterization of Isolates of Waterborne Cryptosporidium spp. Collected Durring an Outbreak of Gastroenteritis in South Burgundy, France" J Clin Microbiol, 2003, 41(6): 2690-2693.

Barwick, et al. "Surveillance for Waterborne-Disease Outbreaks—United States, 1997-1998" MMWR Morb Mortal Wkly Rep, 2000, 49(SS-4): 1-36.

"Cryptosporidium Infections Associated with Swimming Pools—Dane County, Wisconsin, 1993" MMWR Morb Mortal Wkly Rep 1994, 43(31): 561-576.

Mac Kenzie, et al. "A Massive Outbreak in Milwaukee of Cryptosporidium Infection Transmitted Through the Public Water Supply" N Engl J Med, 1994, 331(3): 161-167.

Tschmelak, et al. "Automated Water Analyser Computer Supported System (AWACSS) Part II: Intelligent, remote-controlled, cost-effective, on-line, water-monitoring measurement system" Biosens Biolectron, 2005, 20: 1509-1519.

Straub, et al. "Towards a Unified System for Detecting Waterborne Pathogens" J Microbiol Methods, 2003, 53: 185-197.

Miller, et al. "A novel micromachined high-field asymmetric waveform-ion mobility spectrometer" Sens Actuators B, 2000, 67: 300-306.

Eiceman, et al. "Miniature radio-frequency mobility analyzer as a gas chromatographic detector for oxygen-containing volatile organic compounds, pheromones and other insect attractants" J Chromatogr A, 2001, 917: 205-217.

Miller, et al. "A MEMS Radio-Frequency Ion Mobility Spectrometer for Chemical Agent Detection" Solid-State Sensor and Actuator Workshop, Jun. 4-8, 2000, Hilton Head Island, South Carolina, 120-123.

Krylov, et al. "Field Dependence of Motilities for Gas-Phase-Protonated Monomers and Proton-Bound Dimers of Ketones by Planar Field Asymmetric Waveform Ion Mobility Spectrometer (PFAIMS)" J Phys Chem A, 2002, 106: 5437-5444.

Davis, et al. "Spore biomarker detection using a MEMS differential mobility spectrometer" 12th International Conference on Solid State Sensors, Actuators and Microsystems, Jun. 8-12, 2003, Boston, 1233-1238.

Eiceman, et al. "Separation of Ions from Explosives in Differential Mobility Spectrometry by Vapor-Modified Drift Gas" Anal Chem, 2004, 76: 4937-4944.

Schmidt, et al. "Microfabricated Differential Mobility for Spectrometry with Pyrolysis Gas Chromatography for Chemical Characterization of Bacteria" Anal Chem, 2004, 76: 5208-5217.

Shvartsburg, et al. "Modeling the Resolution and Sensitivity of FAIMS Analyses" J Am Soc Mass Spectrom, 2004, 15: 1487-1498.

Shvartsburg, et al. "Understanding and Designing Field Asymmetric Waveform Ion Mobility Spectrometry Separations in Gas Mixtures" Anal Chem, 2004, 76: 7366-7374.

Eiceman, et al. "Differential mobility spectrometry of chlorocarbons with a micro-fabricated drift tube" Analyst, 2004, 129: 297-304.

Krebs et al. "Detection of Biological and Chemical Agents Using Differential Mobility Spectrometry (DMS) Technology" IEEE Sensors Journal, 2005, 5(4): 696-703.

Miller, et al. "A MEMS radio-frequency ion mobility spectrometer for chemical vapor detection" Sens Actuators A, 2001, 91: 301-312.

Krylova, et al. "Effect of Moisture on the Field Dependence of Mobility for Gas-Phase Ions of Organophosphorus Compounds as Atmospheric Pressure with Field Asymmetric Ion Mobility Spectrometry" J Phys Chem A, 2003, 107: 3648-3654.

Smith, et al. , "The Novel Selected-ion Flow Tube Approach to Trace Gas Analysis of Air and Breath," Rapid Communications in Mass Spectrometry, 1996; 10: 1183-1198.

Manolis, "The Diagnostic Potential of Breath Analysis," Clinical Chemistry, 1983, 29(1): 5-15.

International Search Report for International Application Serial No. PCT/US2004/010288, mailing date of Aug. 20, 2004 (3 pages).

* cited by examiner

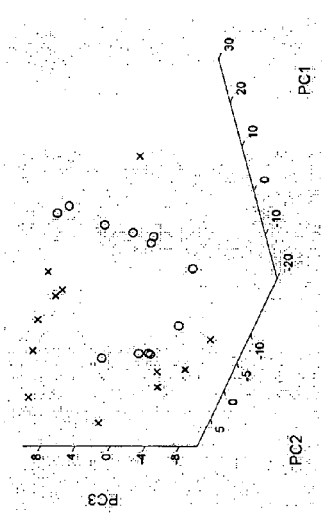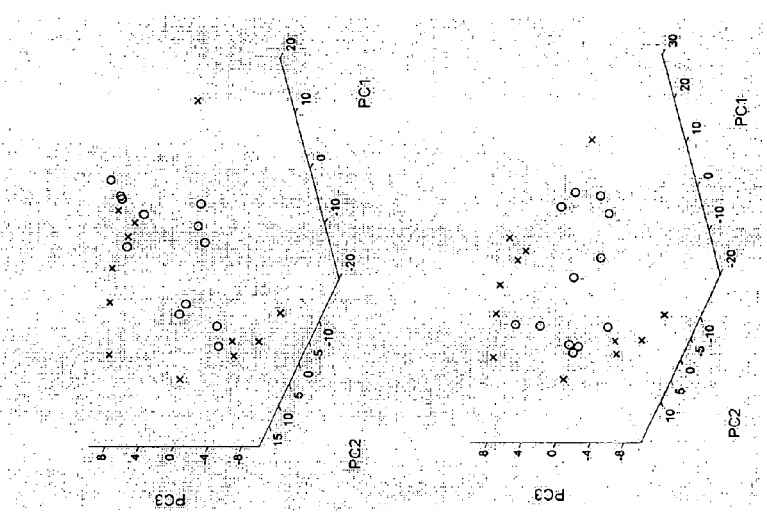
FIG. 3A  FIG. 3B  FIG. 3C

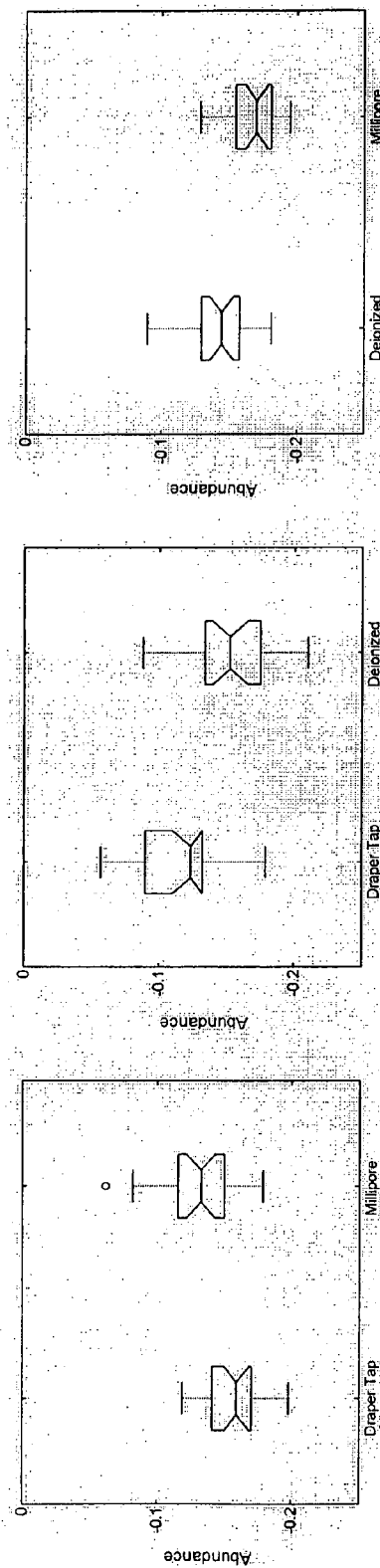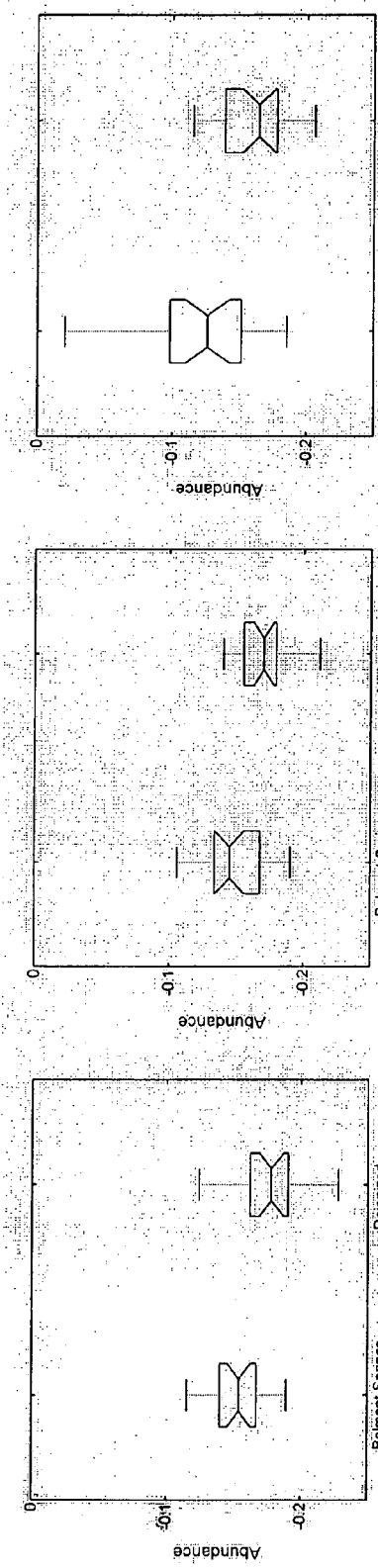

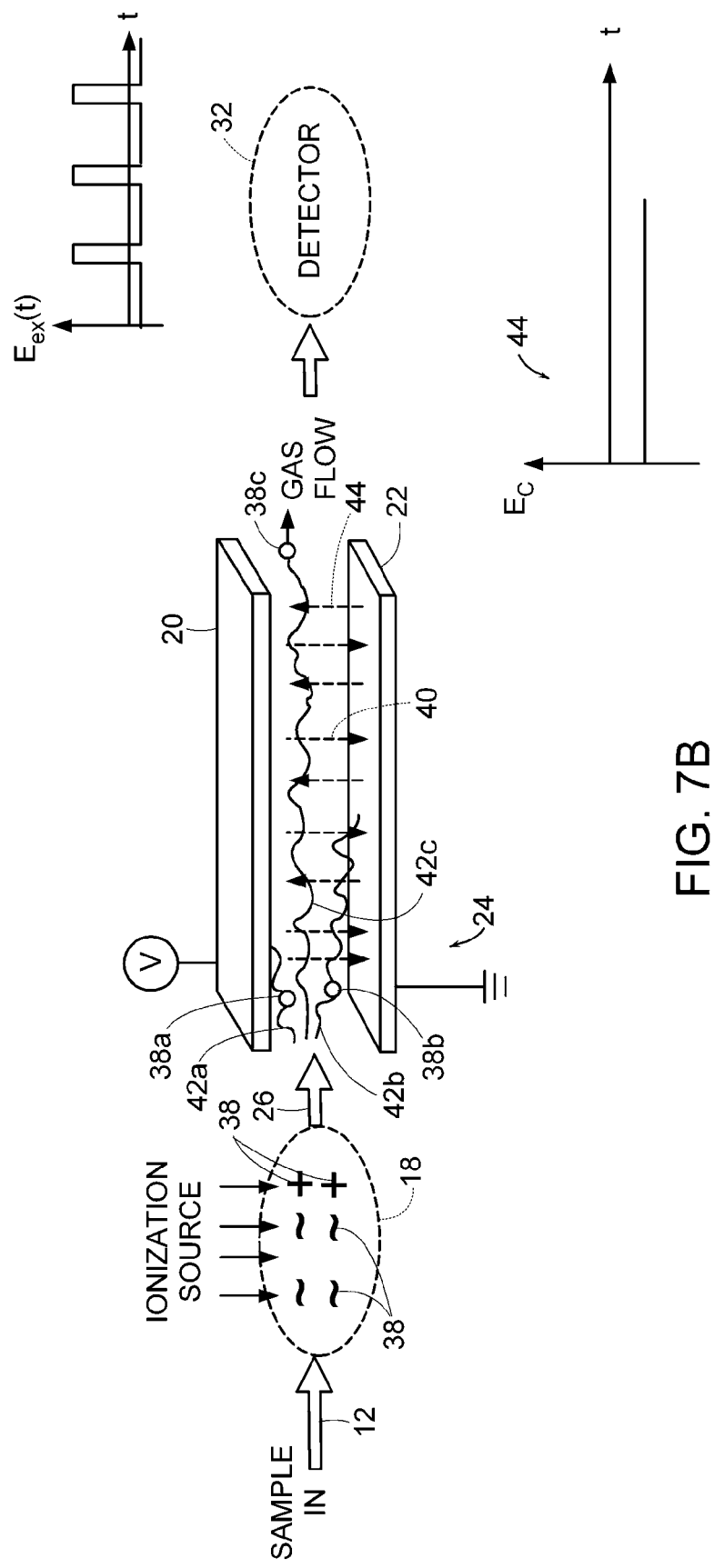

MONITORING DRINKING WATER QUALITY USING DIFFERENTIAL MOBILITY SPECTROMETRY

CROSS-REFERENCE TO RELATED APPLICATIONS

The present application claims the benefit of and priority to provisional application Ser. Nos. 60/678,080 and 60/695,291 filed on May 5, 2005 and Jun. 30, 2005, respectively. This application is also a continuation-in-part of co-pending U.S. Ser. No. 10/817,455 filed on Apr. 1, 2004, which claims the benefit of and priority to provisional application Ser. No. 60/459,424 filed on Apr. 1, 2003. The entire contents of all of these applications are incorporated by reference herein.

TECHNICAL FIELD

The present invention relates generally to analytical methods in the field of fluid quality management and, more specifically, to methods for continuous monitoring of drinking water quality and detection of contaminants therein using differential mobility spectrometry.

BACKGROUND

Water processing dates back to ancient civilizations, where purification methods such as charcoal filtering, sunlight exposure, boiling, and straining were applied for purposes of improving taste and clarity of water. The 1800s saw the rise of water facilities capable of providing water to entire towns. Simultaneously, scientists and epidemiologists elucidated how microscopic organisms could transmit disease through water, and, as a result, most drinking water treatment systems employed a number of filters, e.g. containing sand and/or charcoal, to reduce turbidity and bacteria population. The early 1900s marked the birth of modern treatment facilities which utilized chlorine and ozone disinfectants for increased ability to eradicate pathogens. Although technological improvements and increased federal regulations reduced the prevalence of pathogens, it became evident in the 1960s that industrial and agricultural chemicals posed additional public health concerns. Water treatment facilities implemented new purification techniques to address these contaminants.

Despite modern advances in waterborne disease prevention, severe outbreaks still occur in the U.S. and other developed nations of the world. The 1993 outbreak of *Cryptosporidium* in Milwaukee, Wis., the largest documented waterborne disease outbreak, demonstrated to public health officials that not all waterborne pathogens could be eliminated using established disinfection techniques. Similar outbreaks of *E. coli* in Canada and cases of *Cryptosporidium* outbreaks in the U.K. and Europe point to a serious concern for public health. Furthermore, waterborne pathogens resistant to current purification methods continue to emerge.

To improve uniformity of water treatment facilities across the nation, the U.S. Congress enacted the Safe Water Drinking Act (SWDA) in 1974 to set standards for monitoring and treatment techniques and maximum contamination levels. An essential part of the SWDA and its amendments in 1986 and 1996 was to establish routine monitoring of the nation's water supply to guarantee that chemical toxins and pathogens are maintained at levels that minimize health risk. Currently, quantitative analysis of chemical and biological pollutants is performed with analytical methods such as gas chromatography coupled to mass spectrometry (GC-MS). See, for example, "Standard Methods for the Examination of Water and Wastewater," by American Public Health Association, American Water Works Association, and Water Environment Federation (20th ed. Washington, D.C., 1998), incorporated herein by reference. Tables 1A-1D below shows the quantity of contaminants under regulation and their categorization by the Environmental Protection Agency. Additionally, summaries of the testing frequency, the cost per analysis, and the analytical method are provided.

TABLE 1A

| EPA Contaminant Category | Total Tests in Category |
|---|---|
| Microorganisms | 4 |
| Disinfection Byproducts | 11 |
| Disinfectants | 3 |
| Inorganic Chemicals | 16 |
| Organic Chemicals | 53 |

TABLE 1B

| Required Testing Frequency | Analytes Tested |
|---|---|
| Bi-annually | 1 |
| Quarterly | 65 |
| Monthly | 1 |
| Daily | 2 |
| Continuously | 2 |
| Depends on Source | 3 |
| Information Unavailable | 4 |

TABLE 1C

| Costs per Analysis | Analytes Tested (%) |
|---|---|
| $200-$400 | 65 |
| $50-$200 | 6 |
| Under $50 | 3 |

TABLE 1D

| Analytical Method | Analytes Tested (%) |
|---|---|
| Gas Chromatography w/Mass Spectrometry | 42 |
| Gas Chromatography w/Electron Capture Detection | 24 |
| Gas Chromatography w/Photoionization Detection | 24 |
| Inductively Coupled Plasma w/Mass Spectrometry | 11 |
| Graphite Furnace Atomic Absorption | 10 |
| Colorimetry | 6 |
| Inductively Coupled Plasma w/Atomic Emission Spectrometry | 6 |
| High Performance Liquid Chromatography with Ultraviolet Detection | 5 |
| DPD Ferrous Titrimetric | 3 |
| Gas Chromatography w/Nitrogen-Phosphorus Detection | 3 |
| High Performance Chromatography w/Post-Column Derivitization and Fluorescence Detection | 3 |
| Ion Chromatography | 3 |
| Iodometric Electrode | 3 |
| Gas Chromatography with Electrolytic Conductivity Detection | 2 |
| Ion Chromatography w/Conductivity Detector | 2 |
| Cold Vapor Atomic Absorption | 1 |
| Enzyme Substrate Test | 1 |
| Gas Chromatography w/Flame Ionization Detection | 1 |
| High Performance Liquid Chromatography w/UV Absorption & Fluorescence Detectors | 1 |
| Liquid/Solid Extraction (LSE) | 1 |
| Membrane Filtration | 1 |
| Multiple-tube Fermentation Technique | 1 |
| Transmission Electron Microscopy | 1 |

Analytical laboratories provide many testing services using various technologies. For example, one laboratory in the Greater Boston area offers the following tests: (Bold italics indicate tests specifically for drinking water):

| Impurity to be found: | Technology: |
| --- | --- |
| Trace Metals | Inductively Coupled Plasma Spectrophotometers<br>*Graphite Furnace Atomic Absorption Spectrophotometer*<br>Cold Vapor Atomic Absorption Spectrophotometer (mercury analysis only |
| Wet Chemistry Analysis - Oxygen demand, organic carbon, acidity, alkalinity, bromide, $CO_2$, chloride, cyanide, iron, fluoride, formaldehyde, hexavalent chromium, hydrazine, nitrogen, orthophosphate, oxidizers, peroxide, phenol, phosphorus, sulfate, sulfide, fulfite, tannin & lignin, organic matter, hydrocarbons, chlorine, anions, etc. | Bench chemistry tests<br>*Lachat FIA instrument with IC for analysis of Anions in Drinking water* |
| *Microbiological Analysis-Standard Drinking Water bacteria: E. Coli, Enterrococcus, Fecal Coliform, Fecal Strep, Heterotrophic Plate Count, Total Bacteria, Coliform, and E. Coli* | *Two shifts of chemists, Membrane filtration and multiple tube fermentation (MPN) methods, also Colilert®* |
| Volatile organics-aromatics, halocarbons, all w/various EPA methods listed | GC/MS<br>GC w/various other detectors |
| Extractable organics-<br>*PCBs in water, semivolatile organics in drinking water,*<br>other things not specifically for drinking water | *GC/MS*<br>*GC* |
| Petroleum Hydrocarbons | GC |
| *Specialized Drinking water Analysis-Basic Screen: Bromide, Chlorine Demand, Chlorophyll A, Dissolved organic carbon, Haloacetic Acids-Inorganics: Perchlorate-Ion Chromatography-Secondary Contaminants: Simulated Distribution Study-Title V (VOC-524.2, Nitrate, Ammonia, Total Colifo): Total Organic Carbon, Trihalomethanes, UV Abosrbance @ 254 nm* | *Methods:*<br>*EPA 300.0*<br>*SM 2350B*<br>*SM 10200H*<br>*SM 5310C*<br>*SM 6251B*<br>*SM 300.0*<br>*SM 5710E*<br>*SM 5310C*<br>*EPA 502.2*<br>*EPA 524.2*<br>*SM 5910B* |
| Dissolved gasses-ethane, ethane, methane | GC-MS |

Known microbiological and other analytical processes are typically both time- and labor-consuming, often requiring sensitive detectors and highly trained personnel. As a result, as shown above, tests are typically performed periodically with the majority of contaminants being tested on a quarterly basis. Furthermore, many conventional methods look for a particular contaminant instead of providing a trigger that indicates that something has changed in the water composition.

Accordingly, despite improvements in analytical techniques over the past several decades, a monitoring system that is robust, low-cost, automated, and able to either detect a change in water composition or identify a wide variety of low concentration analytes in real-time is still desirable. In that regard, particularly desirable are inexpensive and highly sensitive first alert systems that continuously monitor the water supply and generate an alarm to warn of a possible water quality problem.

SUMMARY OF THE INVENTION

As discussed above, conventional drinking water systems are deficient with respect to real-time monitoring, and there is a need for a sensor capable of automated detection of trace levels of chemical and microbial contaminants. A sensor that is small, inexpensive, fast, and analyte-independent could enable real-time remote monitoring and provide additional security to the water infrastructure. The regulatory requirements for allowable contaminant levels are demanding and represent a significant challenge to any system.

Accordingly, the present invention addresses the above concerns and contemplates detecting various substances present in water supply utilizing methods of differential mobility spectrometry and, more specifically, microDMx™ sensor chip technology originally developed by The Charles Stark Draper Laboratory (Cambridge, Mass.) ("Draper Laboratory") and presently available from Sionex Corporation (Waltham, Mass.) ("Sionex").

Various embodiments of the present invention enable continuous monitoring of fluid composition, e.g. drinking water supply, with improved detection sensitivity and selectivity to varying degrees of contamination at and below the predetermined maximum contaminant levels, e.g. those stipulated by the EPA. As discussed below, the microDMx™ differential mobility spectrometry demonstrates satisfactory sensitivity for continuous water monitoring when used to analyze both pristine and contaminated water samples. Specifically, using first order statistical methods and principal component analysis, it was demonstrated that the microDMx system, with sensitivity in the ppb to ppt range, is capable of distinguishing between pristine water from different sources. Its sensitivity to contaminants in water has also been evaluated. Water samples spiked with standard drinking water contaminants were analyzed, and unique spectral patterns were found. Furthermore, differential mobility spectrometry showed high degree of sensitivity to varying degrees of contamination. Thus, in certain embodiments, when coupled with sophisticated bioinformatics capabilities, the present invention enables continuous water monitoring in an integrated water quality and biological detection system.

As discussed in more detail below, differential mobility spectrometry was shown to be sensitive to small changes in water and capable of detecting trace amounts of standard contaminants, exceeding even the strictest governmental regulations. Furthermore, it was demonstrated that the microDMx system is concordantly responsive to contaminant concentrations, which allows the development of signal thresholds for more effective detection.

In general, in one aspect, the invention relates to a method for monitoring of fluid—e.g. drinking water—composition using a field asymmetric ion mobility spectrometer. The method includes the steps of (a) providing a first fluid sample, (b) generating a first time-averaged ion abundance profile corresponding to the composition of the first fluid sample, (c) providing a second fluid sample, (d) generating a second time-averaged ion abundance profile corresponding to the composition of the second fluid sample; and then (e) detecting a change in the fluid composition by comparing the second profile to the first profile. The field asymmetric ion mobility spectrometer may include an ionization source for ionizing the fluid sample and creating ions, a housing defining an analytical gap; an ion filter disposed in the analytical gap downstream from the ionization source, and including electrodes on an inside surface of the housing for creating an asymmetric electric field to filter the ions; an ion flow generator including electrodes proximate but insulated with respect to the ion fitter electrodes for creating an electric field transverse to the asymmetric electric field for propelling ions through the asymmetric electric field; and an ion detector for sensing ions not filtered by the ion fitter.

In some embodiments, steps (c), (d), and (e) are performed in sequence substantially immediately following step (b). In other embodiments, steps (c), (d), and (e) are performed in sequence at a time interval, e.g. no more than 1 day, 1 hour, or 1 minute, following step (b).

BRIEF DESCRIPTION OF THE DRAWINGS

The invention, in accordance with preferred and exemplary embodiments, together with further advantages thereof, is more particularly described in the following detailed description, taken in conjunction with the accompanying drawings, in which:

FIGS. 3A-3C depict score plots of the first three principal components for water samples of FIGS. 2A-2D;

FIGS. 4A-4F depict box plots of statistically separated points between compared water types of FIGS. 2A-2D;

FIG. 7B is a schematic representation of ions as they pass through a field asymmetric ion mobility spectrometer.

DESCRIPTION

As mentioned above, chemical and biological contaminants in the water supply pose serious public health risks, and government efforts have gone a long way to mitigate these risks. However, the cost and time associated with conventional testing methods prevents water monitoring from occurring on the continual basis necessary for the desired level of security. As discussed in more detail below, microDMx technology can detect the presence of chemicals in water at levels below the U.S. regulatory limit. As shown below, detection with pyrolysis-differential mobility spectrometry is sensitive enough to distinguish pristine water differing only by its origin. Pyrolysis provides the thermal energy for chemical fragmentation and volatilization of water and any chemicals contained therein. Generation of chemical fingerprints, series of data points that have the same relative ratio to each other, relies on the ability to separate ionized samples based on variations in ion mobility.

MicroDMx™ sensor chip technology, as described in, for example, U.S. Pat. Nos. 6,495,823 and 6,512,224 incorporated herein by reference, stems from the realization that an extremely small, accurate and fast Field Asymmetric Ion Mobility filter and detection systems can be implemented using MEMS and microfabrication technology to define a flow path between a sample inlet and an outlet using a pair of spaced substrates and disposing an ion filter within the flow path. The filter includes a pair of spaced electrodes, with one electrode associated with each substrate, and a controller for selectively applying a bias voltage and an asymmetric periodic voltage across the electrodes to control the path of ions through the filter. In its various aspects, this technology separates and detects ionized compounds based on their differential mobilities through the sensor chip described above. Ionized compounds have mobilities which are a function of their charge, mass and cross-sectional area. By applying an RF and DC field to the sensor chip it can act as a filter selecting a chosen ion or collection of ions. The applied DC and RF fields can be used as parameters to identify the ions together with additional information, such as field dependence. This device is small, inexpensive, highly sensitive to the parts-per-trillion range and is capable of detecting a variety of chemicals and biological materials.

Figure 7A:
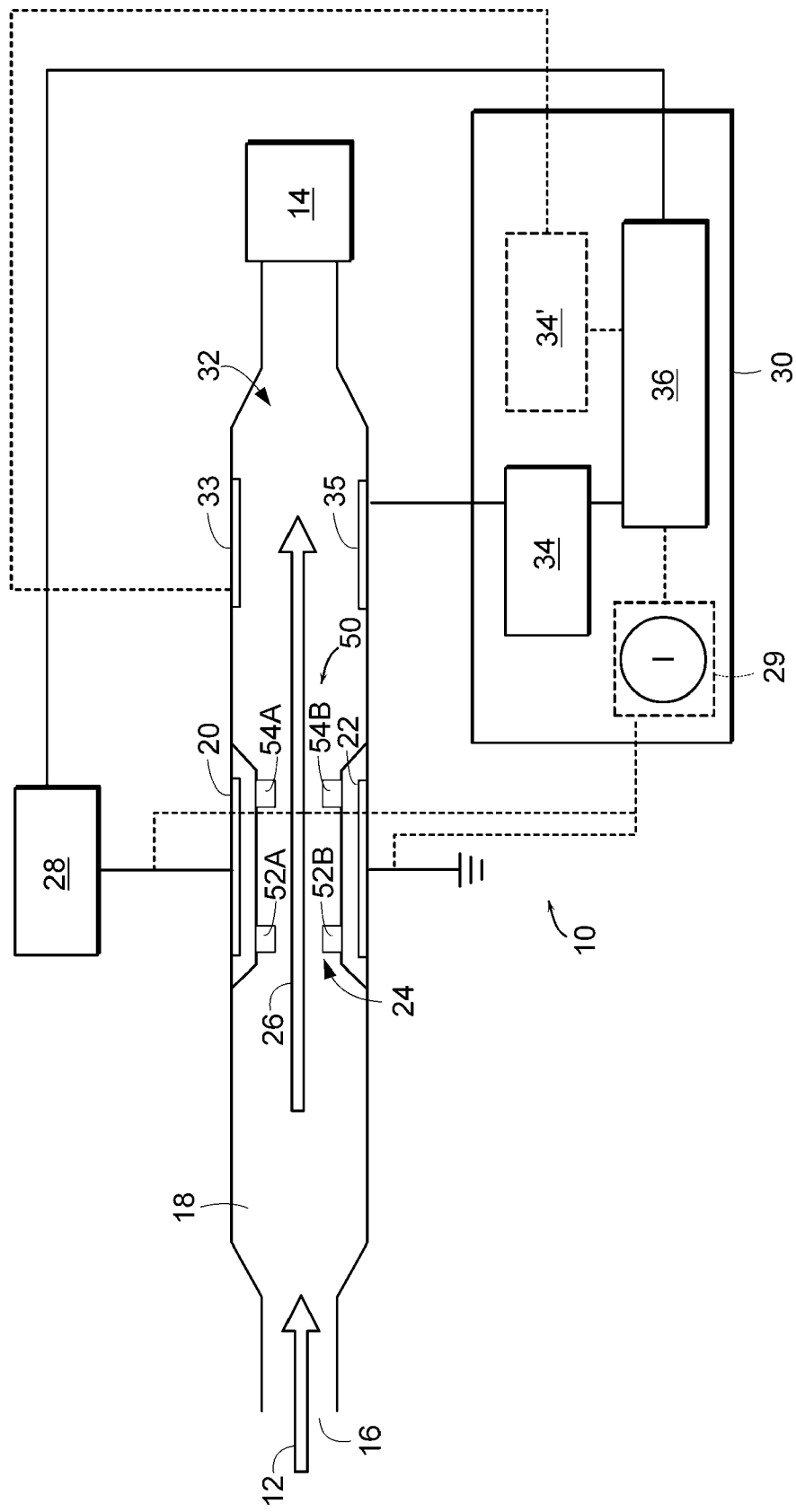
FIG. 7A is a schematic block diagram of a field asymmetric ion mobility spectrometer.

More specifically, as shown in FIGS. 7A and 7B, the field asymmetric ion mobility spectrometer operates by introducing a gas, indicated by arrow 12, into ionization region 18. The ionized gas follow flow path 26 and are passed between parallel electrode plates 20 and 22 that make up the ion filter 24. As the gas ions pass between plates 20 and 22, they are exposed to an electric field between electrode plates 20 and 22 induced by a voltage applied to the plates. In one embodiment, the electric field produced is asymmetric and oscillates in time.

As ions pass through filter 24, some are neutralized by plates 20 and 22 while others pass through and are sensed by ion detector 32. In one embodiment, the detector 32 includes a top electrode 33 at a predetermined voltage and a bottom electrode 35, typically at ground. The top electrode 33 deflects ions downward to the bottom electrode 35. However, either electrode may detect ions depending on the ion and the voltage applied to the electrodes. Moreover, multiple ions may be detected by using top electrode 33 as one detector and bottom electrode 35 as a second detector.

The electronic controller 30 may include, for example, an amplifier 34 and a microprocessor 36. Amplifier 34 amplifies the output of detector 32, which is a function of the charge collected by electrode 35 and provides the output to microprocessor 36 for analysis. Similarly, amplifier 34', shown in phantom, may be provided where electrode 33 is also utilized as a detector.

Referring now to FIG. 7B, as ions 38 pass through alternating asymmetric electric field 40, which is transverse to gas flow 12, electric field 40 causes the ions to "wiggle" along paths 42a, 42b and 42c. Time varying voltage V is typically in the range of +/−(1000-2000) volts and creates electric field 40 with a maximum field strength of 40,000 V/cm. The path taken by a particular ion is a function of its mass, size, cross-section and charge. Once an ion reaches electrode 20 or 22, it is neutralized. A second, bias or compensation field 44, typically in the range of +/−2000 V/cm due to a +/−100 volt dc voltage, is concurrently induced between electrodes 20 and 22 by a bias voltage applied to plates 20 and 22, also by voltage generator 28, FIG. 7A, in response to microprocessor 36 to enable a preselected ion species to pass through filter 24 to detector 32. Compensation field 44 is a constant bias that offsets alternating asymmetric field 40 to allow the preselected ions, such as ion 38c to pass to detector 32. Thus, with the proper bias voltage, a particular species of ion will follow path 42c while undesirable ions will follow paths 42a and 42b to be neutralized as they encounter electrode plates 20 and 22.

The output of field asymmetric ion mobility spectrometer 10 is a measure of the amount of charge on detector 32 for a given bias electric field 44. The longer the filter 24 is set at a given compensation bias voltage, the more charge will accumulate on detector 32. However, by sweeping compensation voltage 44 over a predetermined voltage range, a complete spectrum for sample gas 12 can be achieved. The field asymmetric ion mobility spectrometer according to the present invention requires typically less than thirty seconds and as little as one second to the species to be detected can be varied to provide a complete spectrum of the gas sample.

Referring again to FIG. 7A, the field asymmetric ion mobility spectrometer may include an ion flow generator 50 for propelling the ions 38 generated by the ionization source through the asymmetric electric field 40 created by the ion filter 24 and toward the detector 32. Opposed electrode pairs 52A, 52B and 54A, 54B may create the ion flow generator 50, for example ring electrode pairs and/or planar electrode pairs. Also, the ion flow generator 50 may create a longitudinal electric field in the direction of the intended ion travel, toward, for example, the detector 32. The strength of the longitudinal electric field can be constant in time or space and can vary with time and space. The longitudinal electric field can propel ions 38 through asymmetric electric field 40.

In one embodiment, the ion filter 24 is disposed in an analytical gap, downstream from the ionization source, for creating an asymmetric electric field to filter ions generated by the ionization source.

In various embodiments of the invention, continuous monitoring of the water composition using a field asymmetric ion mobility spectrometer involves generating, for example with microprocessor 36, time-averaged ion abundance profiles corresponding to the composition of the water samples periodically supplied, for example in the direction of arrow 12. A change in the water composition is detected by, for example, the microprocessor 36, by comparing the profile of the current sample to the profile of the preceding sample. The samples can be tested either at time intervals, e.g. daily, hourly, or every minute, or continuously.

In various embodiments of the invention, continuous monitoring of the water composition using a field asymmetric ion mobility spectrometer involves generating time-averaged ion abundance profiles corresponding to the composition of the periodically supplied water samples. A change in the water composition is detected by comparing the profile of the current sample to the profile of the preceding sample. The samples can be tested either at time intervals, e.g. daily, hourly, or every minute, or continuously.

A variety of experimental techniques discussed below were used to study detection capability and sensitivity of microDMx technology for water monitoring.

A. Instrumentation

The differential mobility spectrometer used for chemical and biological detection was a microDMx™ SDP-1 unit obtained from Sionex. As a result of miniaturization via microfabrication methods, the sensor has enhanced sensitivity and detection resolution to the parts-per-trillion range. As discussed above, differential mobility spectrometry functions by ionizing particles and filtering them according to their mobility in high-amplitude radio frequency fields. An ion's mobility is dependent on its charge, mass, and volume, as well as the applied electric field. Gaseous sample entering the sensor is ionized by a radioactive nickel, 63Ni, source. For filtering, the applied electric field consists of two components—an asymmetric waveform electric field which alternates between high- and low-strength fields, and a low-strength DC compensation voltage. The asymmetric field amplitude is held constant while the DC compensation voltage is adjusted permitting only particular ion species to pass through the filter and collide with a Faraday detector. Uncompensated ions fail to reach the end of the filter and are scattered towards the ion filter electrodes, neutralized, and carried out of the system via carrier gas. By noting fitter field conditions and detection current amplitude, ion species can be determined. To allow simultaneous detection of diverse ion species deriving from the same sample, the differential mobility spectrometer can be programmed to sweep through a range of compensation voltages over an established duration.

B. Experimental Setup

Headspace, i.e. equilibrated air, collected by an automated sampler above heated water samples at (60° C. and 65° C.) was sent through a gas chromatograph megabore guard column and into the DMx unit, programmed to sweep through a range of compensation voltages from −40 volts (V) to 10 V. Specifically, the Pyroprobe 1000 pyrolyzer available from CDS Analytical, Inc. (Oxford, Pa.) was connected to the inlet port of an HP 5890 gas chromatograph ("GC") with inlet and detector port temperatures of 150° C. and oven temperature of 200° C. The pyrolyzer interface temperature was 110° C. Each 4 µL sample was pyrolyzed at 700° C. for 20 seconds with ramping rate of 0.01° C./msec and carried by a 10 ml/min nitrogen ($N_2$) gas flow. Once pyrolyzed, the sample was carried through a 0.5 m guard column with an additional 30 ml/min N2 gas flow. Upon exiting the GC oven, the $N_2$/sample flow was combined with a 300 ml/min $N_2$ flow at the detector port of the GC before entering the sensor. The microDMx sensor was programmed to sweep through a range of compensation voltages from −40 volts (V) to 10 V. The RF field was set to 1200 V. Detection by the microDMx sensor produced a three-dimensional spectrum. The two independent axes are compensation voltage and scan. One scan is approximately 1.6 seconds. The dependent axis is an arbitrary unit representative of the detected ion abundance at a specific compensation voltage and time.

C. Data Analysis

Data was prepared by setting the beginning of each file to the start of pyrolysis and the duration to 60 scans. To adjust for any slight variations in the Vc dimension due to temperature and moisture, all files were aligned along the compensation voltage dimension according to methods developed for this differential mobility spectrometry data.

Principal components analysis (PCA) was performed to determine whether the different water types could be distinguished from one another. This was accomplished by tailoring standard PCA analysis techniques for use with this data in MATLAB® software (Natick, Mass.). The data was first formatted by appending subsequent columns in the data matrix to the previous column creating a single vector that maintained all information. Several components are usually required to describe the variance in the data. For standardized comparison, plots of the first three PCs were produced. Resulting patterns are presented for comparisons between Draper tap water and each of the other three water types. For first order statistical analysis, ANNOVA functions in MATLAB were used to calculate statistics between points.

Sensitivity Experiments

Several different water types were collected to provide analysis of the system's sensitivity:
 (1) Draper Laboratory tap water;
 (2) Cambridge, Mass. municipal tap water;
 (3) Quincy, Mass. municipal tap water;
 (4) Draper Laboratory lab-grade water deionized by an 18 mega ohm reverse osmosis process;
 (5) Harvard Center for Blood Research deionized water; and
 (6) Monadnock® distilled water.

Figure 1A:
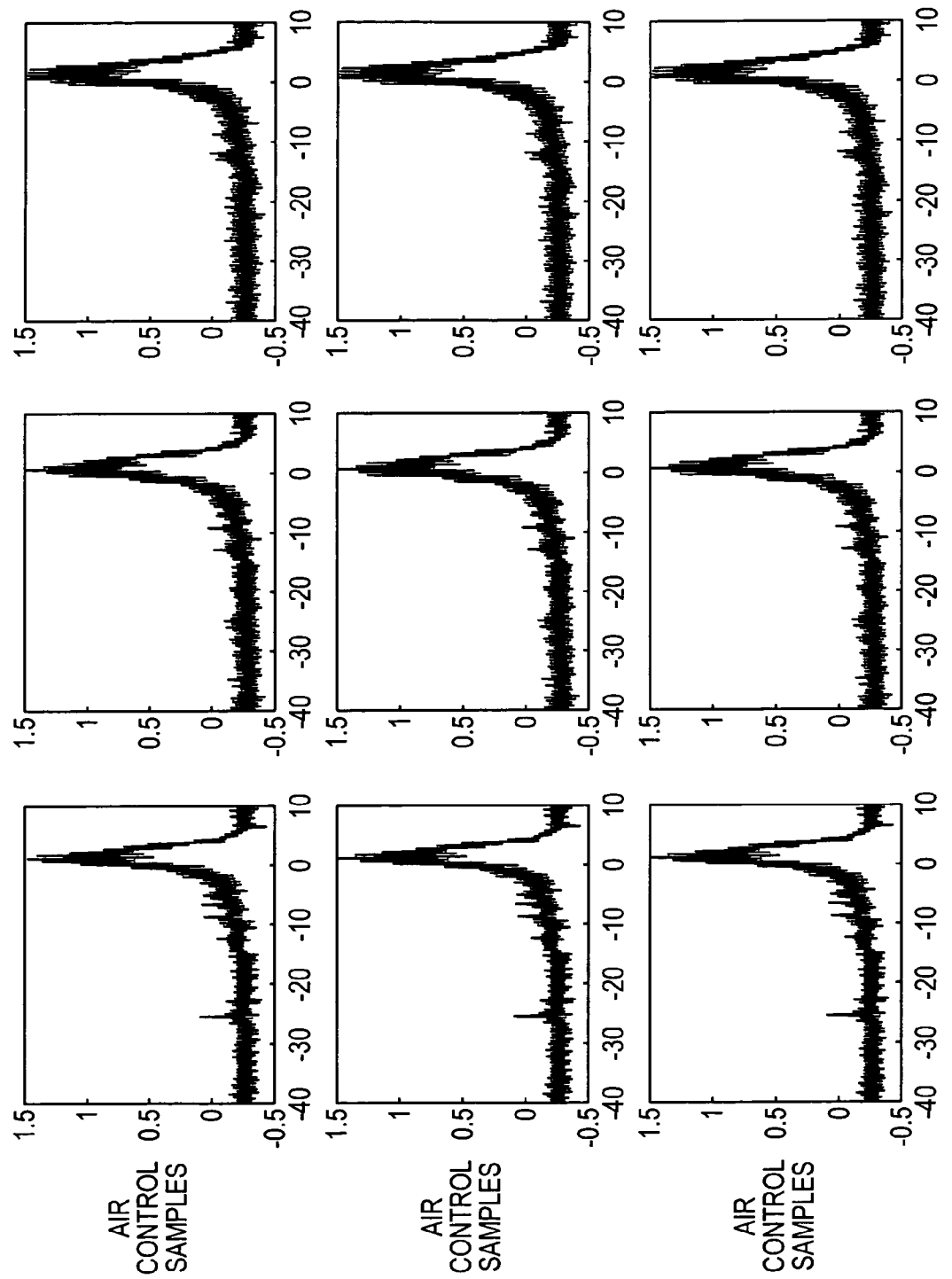
FIGS. 1A-1E and 2A-2D depict characteristic time-averaged ion abundance profiles for each of tested water samples.
Figure 1B:
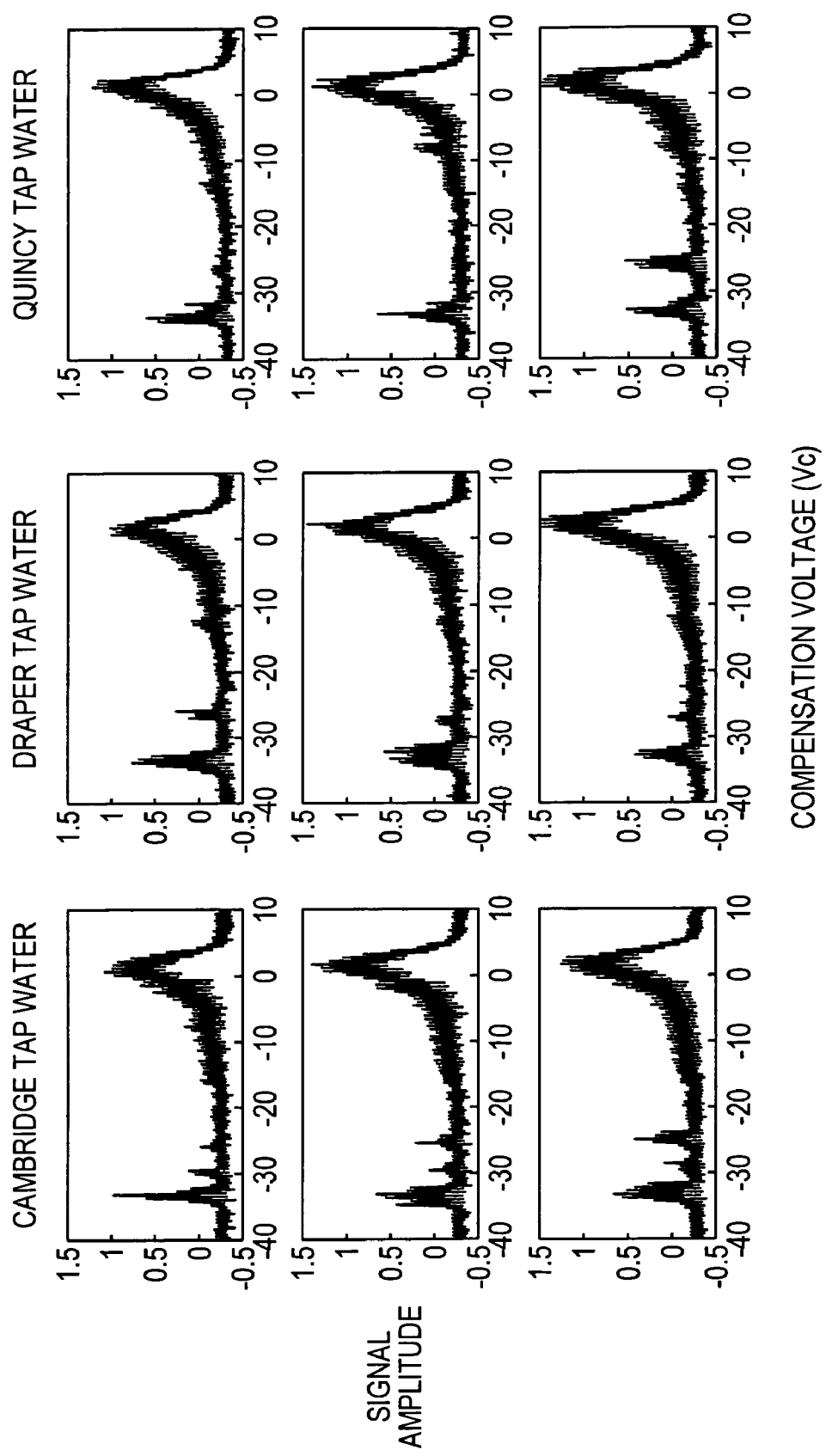

A characteristic time-averaged ion abundance profile was created for each sample, and the profiles from repeat runs were then averaged as shown in FIGS. 1A-1E, with signal amplitude on the y-axis and compensation voltage on the x-axis. FIG. 1A shows test results for three sample vials with air only, as a control measurement. Each sample was analyzed 3 times. There is visible reproducibility between samples performed on the same sample vial, and each sample vial had unique spectral patterns associated with it. FIG. 1B shows test results for three local sources of water: tap water of Cambridge, Mass.; Draper Laboratory tap water, and tap water of Quincy, Mass. As shown in FIG. 1B, each water source has some similar features unique to water itself. However, there are some spectral features that are unique to the water source, representing impurities in the water.

Figure 1C:
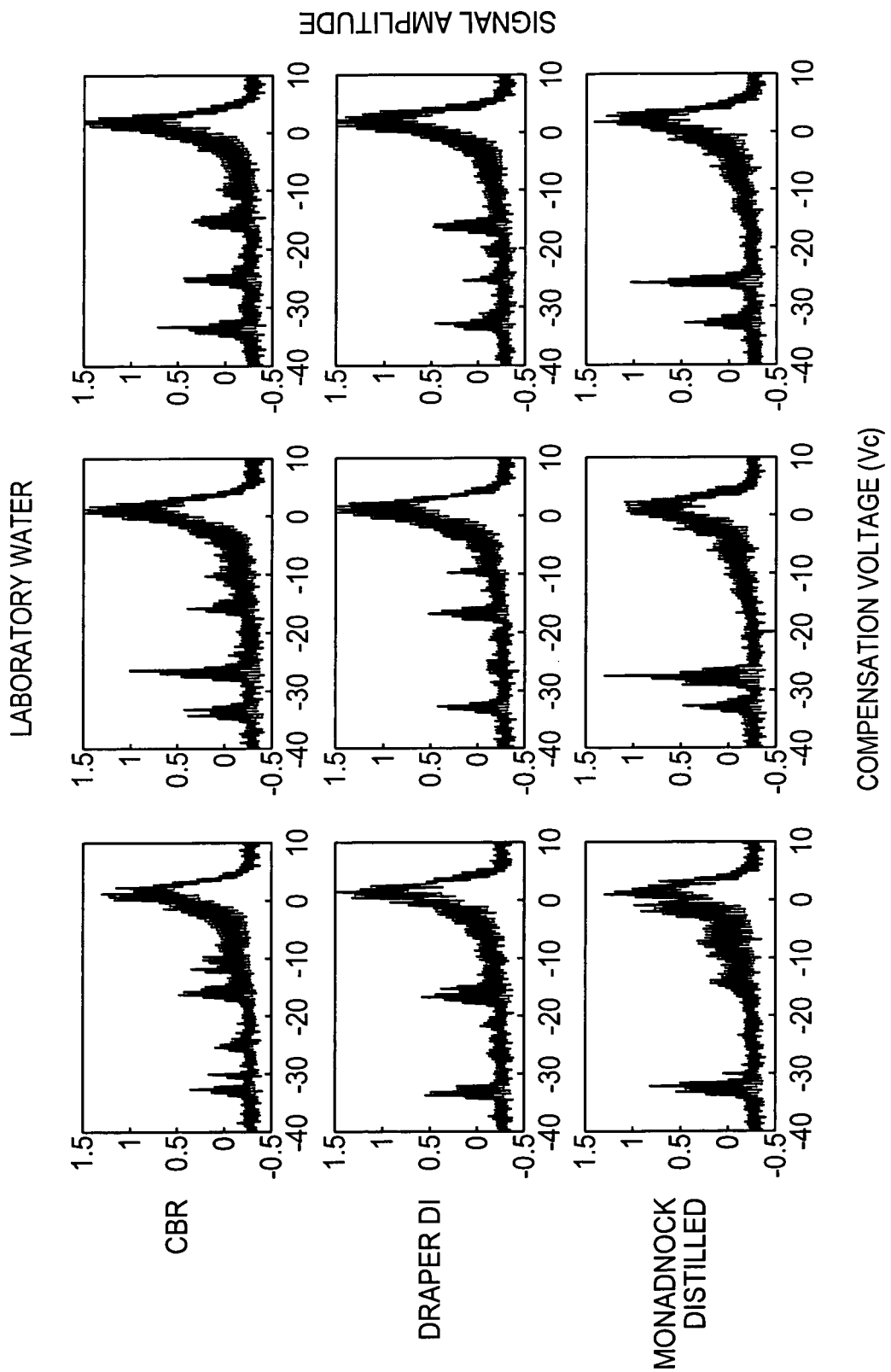
Figure 1D:
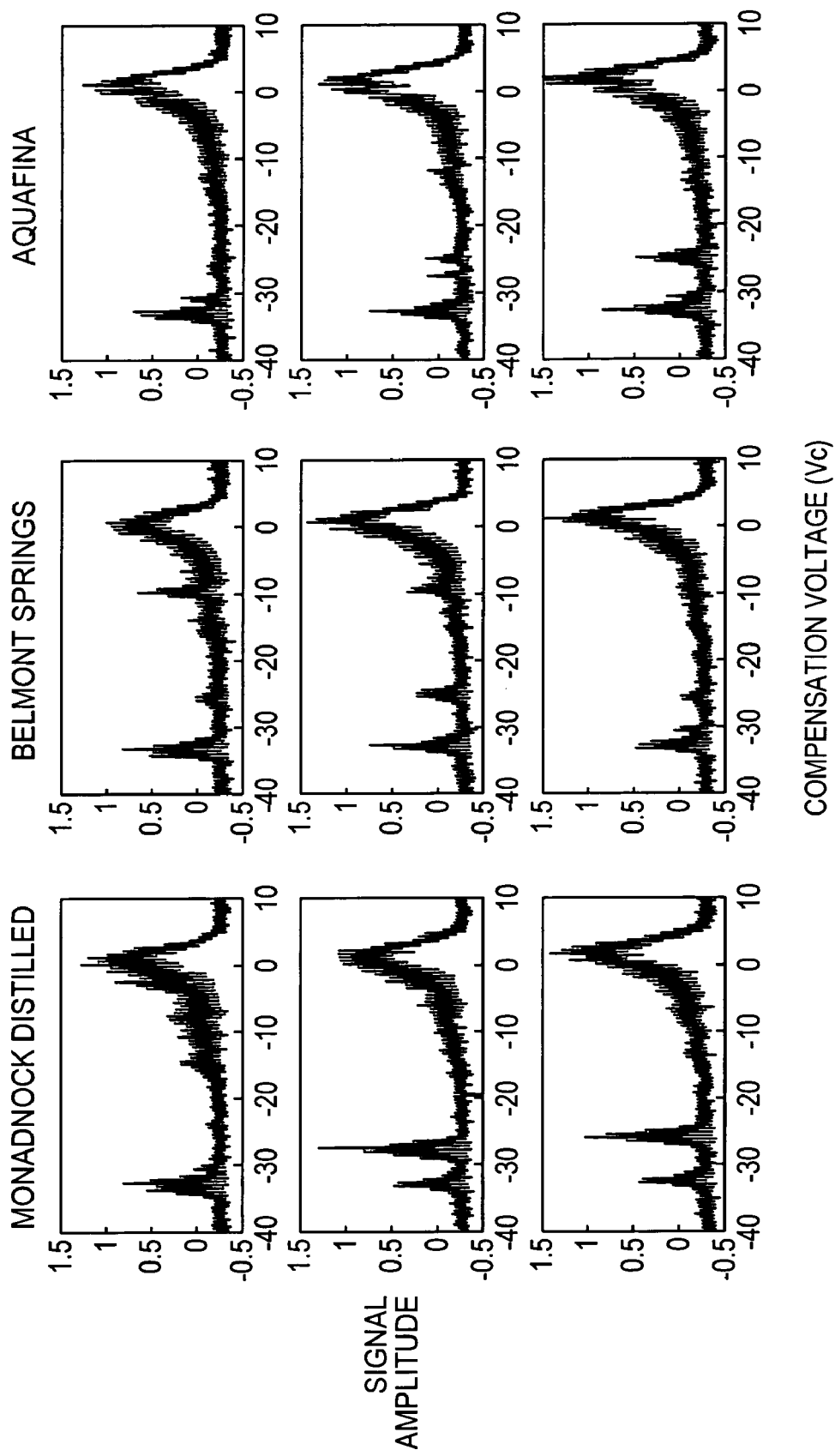
Figure 1E:
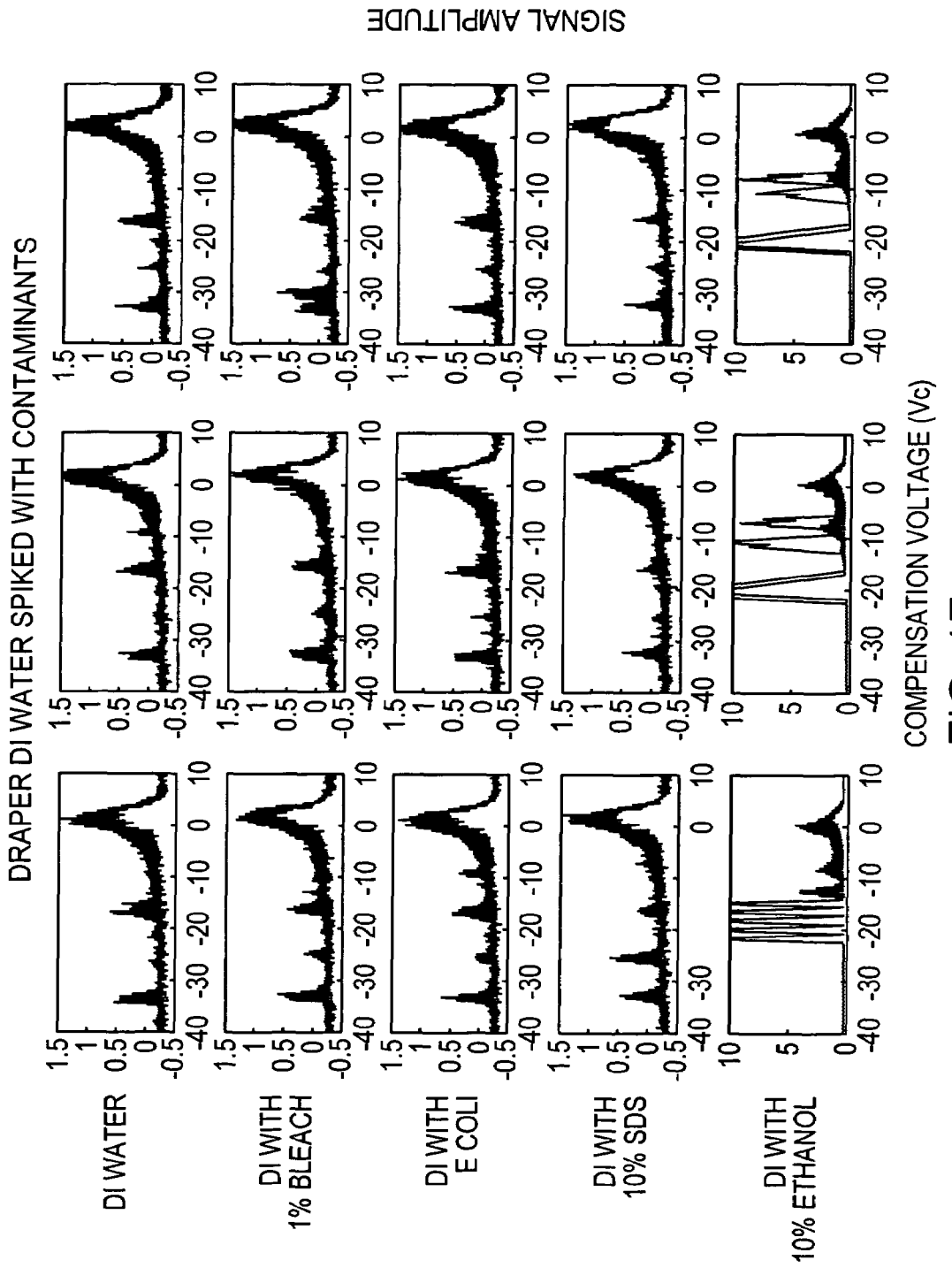
Figure 2A:
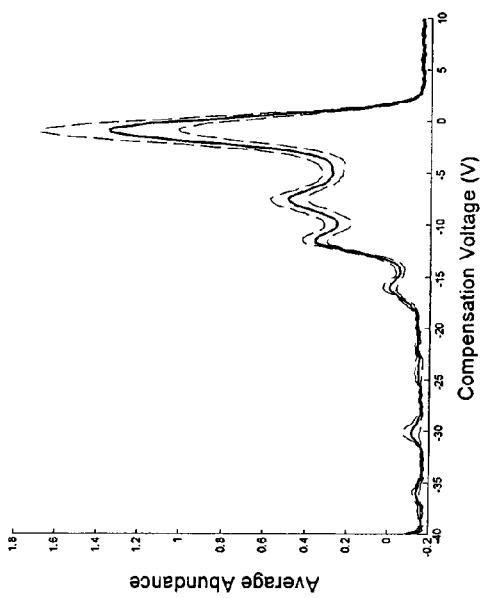
Figure 2B:
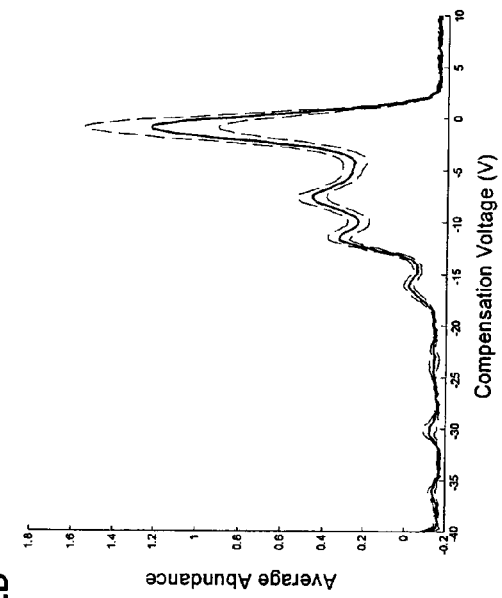
Figure 2C:
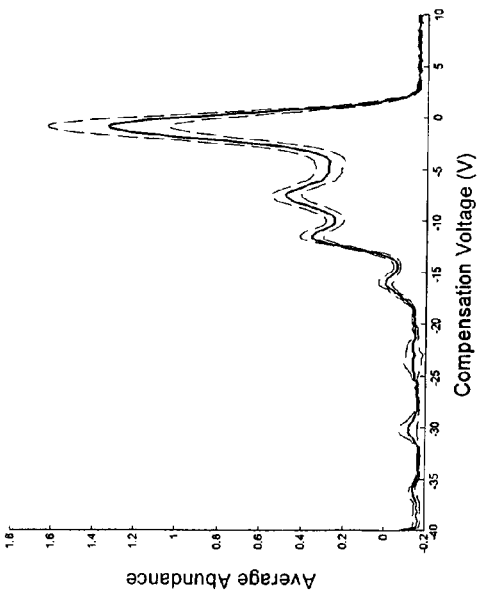
Figure 2D:
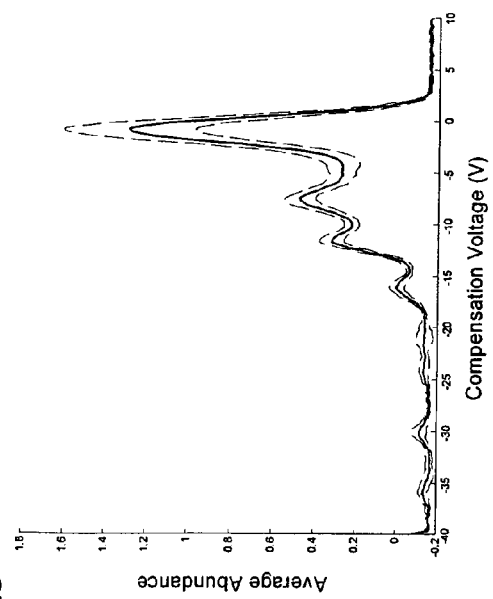

FIG. 1C shows test results for three types of distilled or dionized (DI) water: Draper Laboratory DI water, Harvard Center for Blood Research DI water, and Monadnock distilled water. Spectral features appear distinct for each sample type. FIG. 1D shows water sample differences from three common manufacturers of bottled water. FIG. 1E shows spectral complexity can be introduced by adding contaminants to the water samples, as discussed below.

Thus, several features common to all water sources were detected with several features being consistently stronger in one kind of water than in another kind of water, and several features being present in one kind of water and not in another kind of water. These results indicate that the presence, although not the identity, of different impurities in water can be detected. Thus, this technology provides an advantage over conventional methods by being able to:
 detect many sorts of contamination/impurities simultaneously (without having to do multiple tests);
 provide immediate, in-line trigger feedback of whether water composition has changed with a negligible investment of time, labor, and resources; and
 detect different changes than resistance methods and also be able to be then coupled to a contaminant identification method, such as mass spectrometry.

Detection Experiments

Four different water types, all of which conformed to specifications for the production of safe drinking water were collected to provide baseline analysis of the system's sensitivity to water:
 (1) Draper Laboratory tap water, used as a representative sample of Cambridge, Mass. municipal water;
 (2) Belmont Springs® bottled drinking water (DS Waters of America, LP, Atlanta, Ga.),
 (3) Purified laboratory-grade water (Millipore Corporation, Billerica, Mass.),
 (4) Draper Laboratory lab-grade water deionized by an 18 mega ohm reverse osmosis process.

Chemicals from three EPA contaminant classes were selected based on their EPA-established maximum contaminant level (MCL) and availability. Where availability was analogous, chemicals with higher MCLs were chosen on the presumption that larger concentrations would yield superior detection results. 99.7% analytical grade toluene (J.T. Baker, Phillipsburg, N.J.) and ammonium nitrate (Sigma-Aldrich, St. Louis, Mo.) were used as the representative organic and inorganic contaminants respectively. EPA regulation for microbiological contaminants is based on total coliform detection. *E. coli* DH5 (ATCC 53868) (American Type Culture Collection, Manassas, Va.) was used as a representative coliform and enteric pathogen.

Each contaminant was dissolved in deionized water, and serial dilutions were performed to produce five concentrations: the MCL and one and two orders of magnitude above and below the MCL for that contaminant. Five toluene concentrations were tested that varied by a magnitude of order and ranged from 0.01 to 100 ppm. Similarly, ammonium nitrate concentrations ranged from 0.1 to 1,000 ppm. For *E. coli*, the optical densities of the solutions were measured at 600 nm. Using a concentration curve created for the *E. coli*, the number of cells per 4 $\mu$l experiment was calculated: A=340,000 cells, B=34,000 cells, C=3,400 cells, D=340 cells, and E=34 cells.

Twenty-five pyrolysis-differential mobility spectrometry detection experiments were performed for each of four water samples mentioned above: (a) Belmont Springs distilled water (b) deionized water from Draper Laboratory (c) Draper Laboratory tap water (d) Millipore filtered water. A characteristic time-averaged ion abundance profile was created for each sample, and the profiles from repeat runs were then averaged as shown in FIGS. 2A-2D, with signal amplitude on the y-axis and compensation voltage on the x-axis. All samples are 4 $\mu$L of water pyrolyzed at 700° C. for 20 seconds.

Standard deviation above and below this average are also shown with dashed lines. Multiple high amplitude peaks are evident in each water type, and smaller peaks are also visible throughout. However, with the degree of variability in each plot, it is often difficult to differentiate between water types based on these peaks alone. Accordingly, in many embodiments of the invention, principal component analysis (PCA) is employed to obtain a more robust model for distinguishing between water types.

Referring to FIGS. 3A-3C, binary comparison using PCA shows successful separation of Draper tap water from the other three water types. These plots show the data plotted against the top three principle components for x=Draper tap water, o=Belmont Springs water (FIG. 3A);
x=Draper tap water, o=deionized water (FIG. 3B); and
x=Draper tap water, o=Millipore filtered water (FIG. 3C).

The data from different water types clusters in a different pattern, indicating there are observable differences. The data set for each water type was randomly divided in half, and one half was used for algorithms training and the other half for testing. With the testing set, in the comparison of Draper tap water to three other water types PCA correctly identified 58.3% as Draper tap and 66.7% as deionized, 75% as Draper tap and 50% as Millipore filtered, and 66.7% as Draper tap and 33.3% as Belmont Springs, based on the calculation of the discriminants.

Additionally, first order statistics enable the identification of specific points in the data that distinguish between water types with a high degree of statistical significance. ANNOVA function of MATHLAB software was performed on each point in the data sets, and those that were statistically different based on a p-value less than 0.001 were identified. Visual representations of this separability are shown in FIGS. 4A-4F depicting box plots of statistically separated points between compared water types. Each figure shows a standard notched box plot with median value at the center line and upper and lower quartiles making up the outer lines of the box. Although a number of the plots show overlapping ranges, the notches do not overlap and there is a statistically significant <0.05 confidence that the median ion abundances at these points are different. In the figures, range was limited to 1.5 x interquartile range (IQR). Outliers, (o), fall outside of this range.

(a) Draper tap water and Millipore filtered water at scan 38 and −19.92 V, p-value=$6.354 \times 10^{-4}$ (FIG. 4A);
(b) Draper Laboratory tap water and deionized water at scan 37 and 2.57 V, p-value=$8.243 \times 10^{-5}$ (FIG. 4B);
(c) Deionized water and Millipore filtered water at scan 25 and −29.16 V, p-value=$1.481 \times 10^{-4}$ (FIG. 4C);
(d) Belmont Springs water and deionized water at scan 18 and −23.73 V, p-value=$1.981 \times 10^{-4}$ (FIG. 4D);
(e) Belmont Springs water and Millipore filtered water at scan 24 and −22.13 V, p-value=$8.133 \times 10^{-4}$ (FIG. 4E); and
(f) Draper Laboratory tap water and Belmont Springs water at scan 25 and −34.98 V, p-value=$2.904 \times 10^{-4}$ (FIG. 4F)

Thus, for each binary comparison between water types, a single statistically significant spectral location capable of distinguishing between the two types with 99% confidence was identified, based on the box plot technique depicted in FIGS. 4A-4F. This analytical method produced more than one such point of statistical separation, and thus provides evidence that each water type likely has multiple unique points making up a characteristic fingerprint that distinguishes it from other water types.

In order to detect contaminants in water at the required EPA level, a high degree of sensitivity to even slight changes in water is necessary. Unlike established chemical techniques for contamination detection, detection by the microDMx system does not make use of analyte-specific concentrating steps before analysis, which is an advantage for fast, real-time analysis. A demonstrated ability to detect differences in closely related sources of water establishes the capacity of the sensor to operate with the required degree of sensitivity. Accordingly, contaminated water samples were examined to establish if there was sensitivity to low concentration additions of standard contaminants. Each of the tested samples demonstrated a highly responsive signal with visibly apparent changes.

Figure 5A:
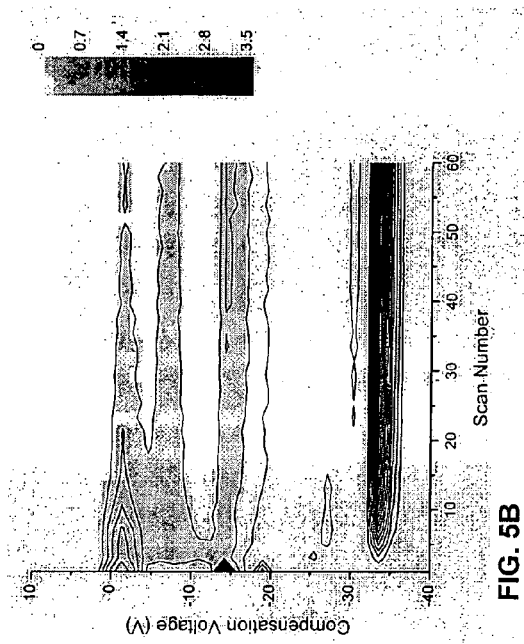
FIGS. 5A-5D depict average differential mobility spectrometry contour plots of four different samples of contaminated water.
Figure 5B:
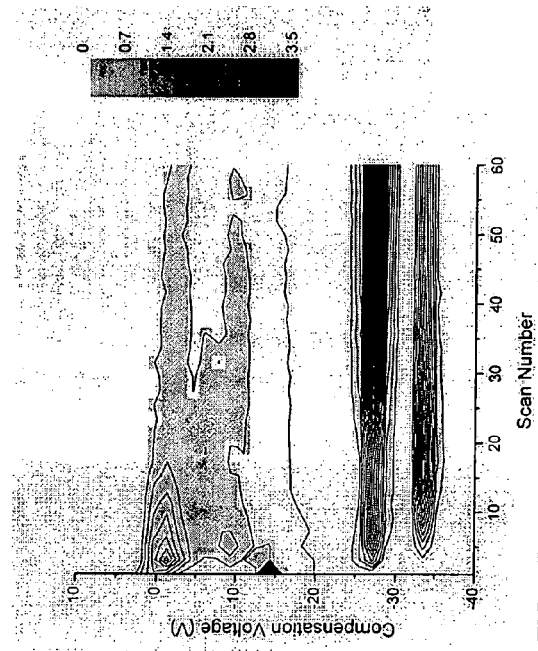
Figure 5C:
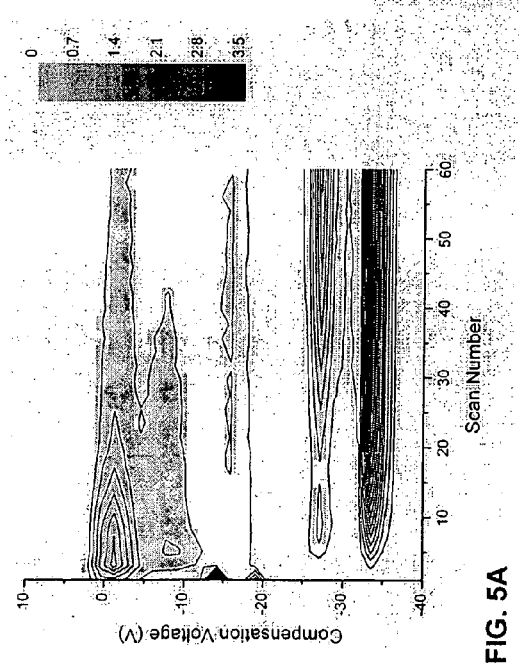
Figure 5D:
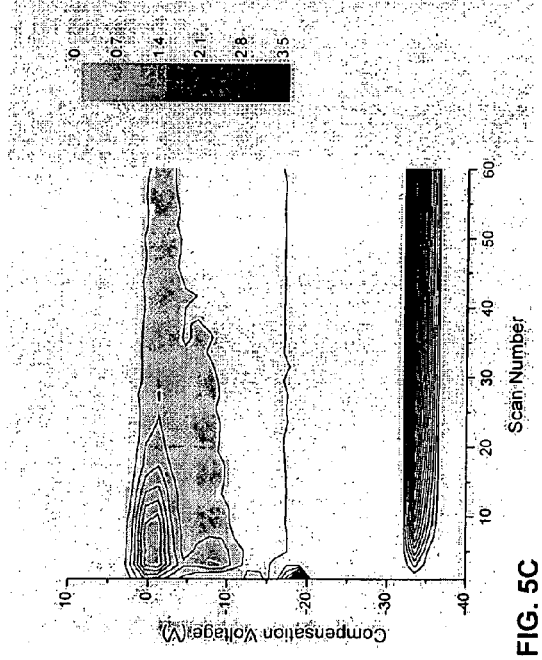

FIGS. 5A-5D depict average differential mobility spectrometry contour plots of contaminated water when using microDMx system with spectral signals averaged across five samples, with scan number on the x-axis, compensation voltage on the y-axis, and with abundance on the z-axis (contours). In this figures, FIG. 5A represents deionized water control sample;
FIG. 5B represents 340 *E. coli* cells in deionized water;
FIG. 5C represents 1 ppm ammonium nitrate in deionized water; and
FIG. 5D represents 0.1 ppm toluene in deionized water.

Each concentration is ten times lower than the U.S. EPA maximum contaminant level (MCL). Components of the deionized water background are evident in each of the three signals with contaminant. Additional features can be identified in the contour plots of the contaminated waters, and the contour maps all have slightly different features from each other. Notably, the sample with *E. coli* appears to have a more complex signal than the others, likely due to the many different chemical components that make up the bacterial cells. Thus, as shown in FIGS. 5A-5D, contaminated water produces visibly apparent changes in the spectra even at concentrations ten-fold below the EPA regulatory limit.

Figure 6A:
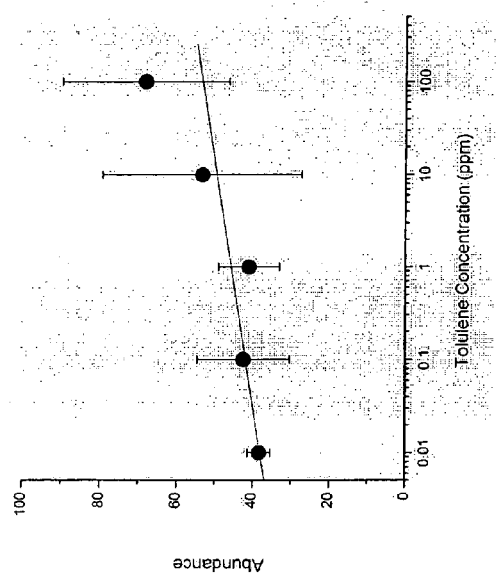
FIGS. 6A-6B show concentration response curves.
Figure 6B:
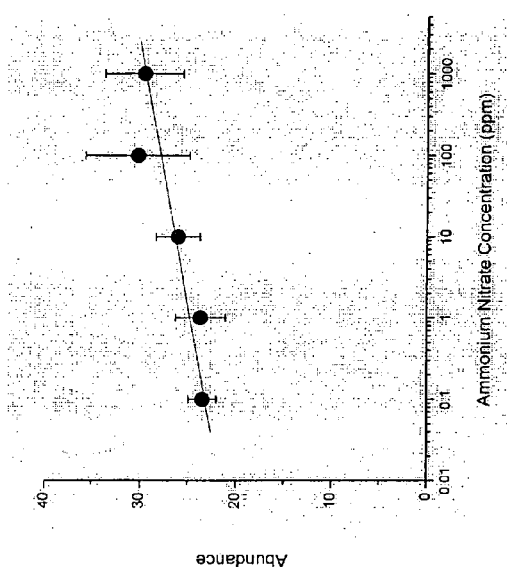

As mentioned above, five concentrations of each contaminant were studied: Toluene ranging from 0.01 to 100 ppm, ammonium nitrate ranging from 0.1 to 1,000 ppm, and *E. coli* ranging in concentration from 340,000 cells to 34 cells. In each range, the middle concentration represents the maximum contaminant concentration allowable for safe drinking water under U.S. governmental regulations. FIGS. 6A-6B show plots of total ion abundance at a specific constant compensation voltage versus contaminant concentration; each point represents an average of five experiments and the standard error is shown by the error bars. FIG. 6A depicts total ion abundance for a signal amplitude at −2 V and toluene concentrations ranging from 0.01 to 100 ppm. FIG. 6B depicts total ion abundance for a signal amplitude at −16 V and ammonium nitrate concentrations ranging from 0.1 to 1000 ppm. A linear estimate of the trend that takes into account the average and standard error values is also shown. This shows that detection is sensitive at particular points in the data, and it is also variable with the level of contamination. The general trend is increasing ion abundance with increasing concentration.

As the above experiments demonstrate, using the average signal profile over time, specific points in the signal that change in tandem with chemical concentration can be found. Thus, differential mobility spectrometry technology is capable of producing a signal responsive to changes in concentration of a particular component of the water composition and thus can be used effectively for contamination level monitoring. While this simplified approach of looking at total ion abundance at a particular compensation voltage does not make use of the full data resolution, FIGS. 6A-6B demonstrate that analysis done in this manner is capable of showing the satisfactory signal responsiveness. The characteristic upward sloping trend shows that signal amplitude increases with higher concentrations.

The invention may be embodied in other specific forms without departing form the spirit or essential characteristics thereof. The foregoing embodiments, therefore, are to be considered in all respects illustrative rather than limiting on the invention described herein.

The invention claimed is:

1. A method for monitoring of fluid composition using a field asymmetric ion mobility spectrometer, the method comprising:
   (a) providing a first fluid sample;
   (b) generating a first time-averaged ion abundance profile corresponding to the composition of the first fluid sample;
   (c) providing a second fluid sample;
   (d) generating a second time-averaged ion abundance profile corresponding to the composition of the second fluid sample; and
   (e) detecting a change in the fluid composition by comparing the second profile to the first profile.

2. The method of claim 1 wherein the field asymmetric ion mobility spectrometer comprises:
   an ionization source for ionizing the fluid sample and creating ions;
   a housing defining an analytical gap;
   an ion filter disposed in the analytical gap downstream from the ionization source, and including electrodes on an inside surface of the housing for creating an asymmetric electric field to filter the ions;
   an ion flow generator including electrodes proximate but insulated with respect to the ion filter electrodes for creating an electric field transverse to the asymmetric electric field for propelling ions through the asymmetric electric field; and
   an ion detector for sensing ions not filtered by the ion filter.

3. The method of claim 1 wherein steps (c), (d), and (e) are performed in sequence substantially immediately following step (b).

4. The method of claim 1 wherein steps (c), (d), and (e) are performed in sequence at a time interval following step (b).

5. The method of claim 4 wherein the time interval does not exceed 1 day.

6. The method of claim 5 wherein the time interval does not exceed 1 hour.

7. The method of claim 6 wherein the time interval does not exceed 1 minute.

8. The method of claim 1 wherein the fluid comprises drinking water.

9. The method of claim 8 wherein the change in the fluid composition comprises an increased concentration of at least one contaminant.

* * * * *

UNITED STATES PATENT AND TRADEMARK OFFICE
CERTIFICATE OF CORRECTION

| | | |
|---|---|---|
| PATENT NO. | : 7,470,898 B2 | Page 1 of 1 |
| APPLICATION NO. | : 11/417897 | |
| DATED | : December 30, 2008 | |
| INVENTOR(S) | : William F. Merrick et al. | |

It is certified that error appears in the above-identified patent and that said Letters Patent is hereby corrected as shown below:

In the Specification, the following paragraph appearing at column 8, lines 1 through 9, is deleted:

"In various embodiments of the invention, continuous monitoring of the water composition using a field asymmetric ion mobility spectrometer involves generating time-averaged ion abundance profiles corresponding to the composition of the periodically supplied water samples. A change in the water composition is detected by comparing the profile of the current sample to the profile of the preceding sample. The samples can be tested either at time intervals, e.g. daily, hourly, or every minute, or continuously."

Signed and Sealed this

Third Day of November, 2009

David J. Kappos
*Director of the United States Patent and Trademark Office*